United States Patent
Debenedetti et al.

(10) Patent No.: US 6,773,479 B2
(45) Date of Patent: Aug. 10, 2004

(54) PARTICULATE FILTER FOR DIESEL ENGINES

(75) Inventors: Massimo Debenedetti, Orbassano (IT); Gianmarco Boretto, Orbassano (IT)

(73) Assignee: C.R.F. Societa Consortile per Azioni, Turin (IT)

(*) Notice: Subject to any disclaimer, the term of this patent is extended or adjusted under 35 U.S.C. 154(b) by 119 days.

(21) Appl. No.: 10/050,109

(22) Filed: Jan. 18, 2002

(65) Prior Publication Data

US 2002/0095918 A1 Jul. 25, 2002

(30) Foreign Application Priority Data

Jan. 19, 2001 (IT) ..................................... TO2001A0034

(51) Int. Cl.[7] .......................... B01D 46/10; B01D 39/20
(52) U.S. Cl. .............................. 55/482; 55/484; 55/495; 55/502; 55/523; 55/524; 55/529; 55/DIG. 5; 55/DIG. 30; 264/610; 264/628; 264/653; 264/660; 264/44; 264/DIG. 48
(58) Field of Search .......................... 55/482, 484, 495, 55/502, 503, 511, 523, 529, DIG. 30, 524, DIG. 5; 60/311; 264/603, 610, 628, 653, 654, 660, 666, 43, 44, DIG. 48

(56) References Cited

U.S. PATENT DOCUMENTS

| | | | | |
|---|---|---|---|---|
| 4,343,149 A | * | 8/1982 | Abthoff et al. ................ | 55/484 |
| 4,343,631 A | * | 8/1982 | Ciliberti ....................... | 55/523 |
| 4,801,382 A | * | 1/1989 | Kemmelmeyer ............. | 55/484 |
| 4,813,231 A | | 3/1989 | Bykowski | |
| 4,826,518 A | | 5/1989 | Furrer et al. | |
| 4,913,712 A | * | 4/1990 | Gabathuler et al. ........... | 55/482 |
| 5,180,408 A | * | 1/1993 | Worner et al. ................ | 55/482 |
| 5,470,364 A | * | 11/1995 | Adiletta ....................... | 55/484 |
| 6,013,118 A | * | 1/2000 | Matsunuma et al. ... | 55/DIG. 30 |

FOREIGN PATENT DOCUMENTS

| | | |
|---|---|---|
| JP | 02166304 | 6/1990 |
| JP | 07313814 | 12/1995 |
| WO | WO 00/69542 A1 | 11/2000 |
| WO | WO 00/69542 | 11/2000 |

OTHER PUBLICATIONS

European Search Report 01128886.7–2113/ dated Jun. 19, 2002.

* cited by examiner

Primary Examiner—Duane Smith
Assistant Examiner—Jason M. Greene
(74) Attorney, Agent, or Firm—Sughrue Mion, PLLC

(57) ABSTRACT

A particulate filter for diesel engines comprises a metal shell or casing inside which is set a filtering body made of ceramic foam. The filtering body is made up of a plurality of separate elements made of ceramic foam and having a substantially plane and elongated shape, which are set about a longitudinal axis of the shell in such a way as to define, inside the shell, an inner chamber (B) set inside the array of filtering elements and at least one outer chamber (A) set outside the array. The said chambers respectively communicate with the intake pipe and with the outlet pipe, or vice versa, in such a way that, during use, the flow of the engine exhaust gases that traverses the shell passing from the intake pipe to the outlet pipe (or vice versa) is forced to traverse the aforesaid filtering elements, thus assuming a component of radial velocity with respect to the longitudinal axis of the shell.

19 Claims, 3 Drawing Sheets

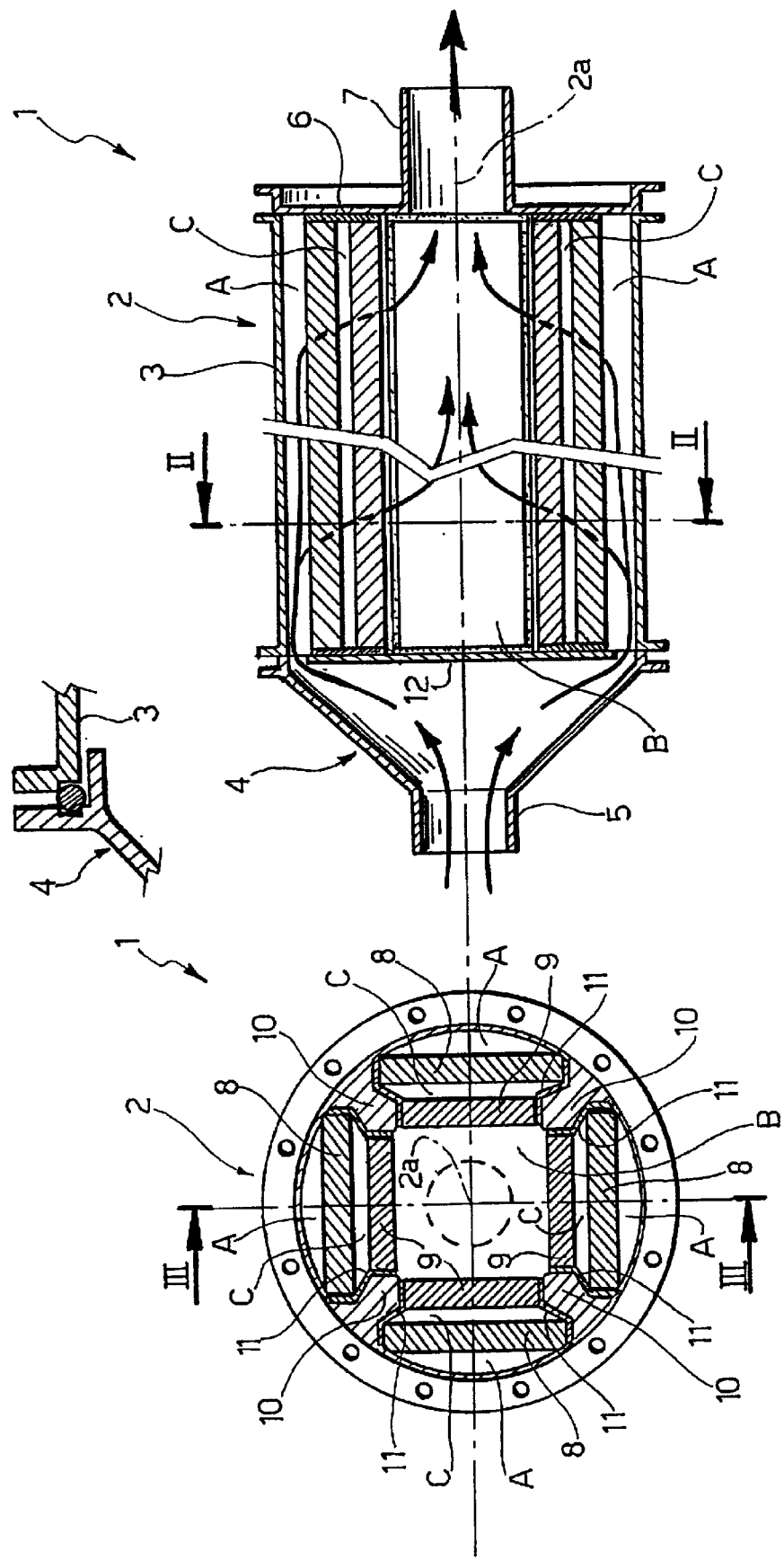

PARTICULATE FILTER FOR DIESEL ENGINES

BACKGROUND OF THE INVENTION

The present invention relates to particulate filters for diesel engines, of the type comprising a metal shell or casing which defines a cavity with an intake pipe and an outlet pipe, and a filtering body made of ceramic foam which is set in the path of communication between said intake pipe and outlet pipe.

A device of the type specified above is described and illustrated in the international patent application WO 00/69542 in the name of the present applicant, published on Nov. 23, 2000. The aforesaid prior patent application refers to a process for obtaining a filtering body for filtering particulate of diesel engines, which is made of a ceramic foam produced starting from a suspension (slurry) with a base of ceramic material, preparing a preform of expanded polymeric material and impregnating the said preform with the ceramic-powder slurry in such a way as to distribute the slurry evenly on the preform, and then subjecting the body thus obtained to a sintering heat cycle, so as to pyrolyse the polymeric material and obtain a high-porosity ceramic material. The powders of ceramic material are chosen from among mullite powder, alumina powder, zirconia powder, and mixtures thereof, which have a very high degree of purity, controlled grain size, and high specific surface.

In the embodiment of the particulate filter illustrated in the above-mentioned international patent, a metal shell or casing is provided, inside which there is set a tubular shell consisting of a ceramic pad, inside which is set a series of disks made of ceramic foam, which are obtained according to the process described above and which are set perpendicular to the direction of the flow of the exhaust gases through the tubular shell.

A drawback that has been encountered in the known filter mentioned above lies in the fact that it is not possible to obtain a large filtering surface without considerably increasing the overall dimensions of the device.

With a view to overcoming the aforesaid drawback, it would be desirable to make a filtering body having a tubular conformation, set inside the shell of the filter in such a way as to be radially traversed by the flow of the exhaust gases. A geometry of this sort would enable a considerable increase in the filtering surface even with relatively small increases in the axial length of the filtering body. However, tests carried out by the present applicant have shown that ceramic foams of the type in question cannot easily be formed in a tubular body with a relatively thick wall. Even if this problem were solved, the products thus obtained would have mechanical properties (above all in terms of resistance to vibrations) not adequate for their use as particulate filters.

SUMMARY OF THE INVENTION

The purpose of the present invention is to overcome the above problem providing a filter in which it is possible to use ceramic foams of the type forming the subject of the prior patent application in the name of the present applicant, and which, at the same time will guarantee the possibility of obtaining a large filtering surface with relatively small overall dimensions of the device.

With this purpose in view, the subject of the present invention is a particulate filter for diesel engines of the type specified at the beginning of the present description, characterized in that the aforesaid filtering body is made up of a plurality of separate elements made of ceramic foam and having a substantially plane shape, which are set about a longitudinal axis of the shell in such a way as to define, inside the shell, an inner chamber set within the array of filtering elements and at least one outer chamber set outside the array, the said chambers respectively communicating with the intake pipe and with the outlet pipe, or vice versa, in such a way that, during use, the flow of the engine exhaust gases that traverses the shell passing from the intake pipe to the outlet pipe is forced to traverse the aforesaid filtering elements, thus assuming a component of radial velocity with respect to the longitudinal axis of the shell. The flow may be either from the outside towards the inside (to maximize the intake filtering surface) or from the inside towards the outside.

Thanks to the aforesaid characteristic, it is possible, on the one hand, to obtain an arrangement that simulates the arrangement of a tubular filtering body, and, on the other hand, to form each of the filtering elements as a plane element, having a relatively thick wall, without any technological difficulty in the execution of the process.

Of course, even though the filter according to the invention is suitable for being used in a particularly advantageous way employing ceramic foams of the type forming the subject of the aforementioned international patent application, it is evident that equally falling within the scope of the invention is a filter having the above-described configuration but using filtering elements made of ceramic foams of a different type.

Thanks to the above-specified characteristics, the device according to the invention is able to present a large filtering surface, albeit having small overall dimensions.

In a preferred embodiment, the filter according to the invention is provided with two concentric arrays of filtering elements. In said preferred embodiment, the elements of each array are four in number and are set orthogonally in pairs facing one another, according to the sides of a rectangle. Preferably, the filtering elements of two adjacent sides rest along their adjacent edges on radial supports that project inwards from a cylindrical wall of the shell. Again preferably, a ceramic pad is set between each radial support and the elements resting thereon.

Furthermore, in the preferred embodiment, the aforesaid cylindrical wall is connected at one end to a bell-like structure having a neck that defines the aforesaid intake pipe (or outlet pipe), the said structure being closed on the opposite side by a diaphragm which has peripheral openings that force the flow of gas entering (or exiting) the shell to pass into the outer chamber set outside the filtering elements. The opposite end of the cylindrical wall is closed by a diaphragm which has a central neck that defines an outlet (or intake) pipe and communicates with the chamber set inside the array of filtering elements. Consequently, during use, the flow of exhaust gases that enters the device is forced to pass into an outer chamber set outside the two concentric arrays of filtering elements. From the said outer chamber the flow of exhaust gases is forced to pass into the inner chamber and to come out through the central opening set at the opposite end of the device, thus radially traversing the two arrays of filtering elements. The flow can be directed also in the opposite direction, i.e., from inside outwards.

BRIEF DESCRIPTION OF THE DRAWINGS

Further characteristics and advantages of the present invention will emerge from the ensuing description, with reference to the attached drawings, provided purely by way of non-limiting example, in which:

FIG. 2 is a cross-sectional view of the device, according to the line II—II of FIG. 3;

FIG. 3 is a cross-sectional view of the device, according to the line III—III of FIG. 2;

FIG. 3A illustrates a detail at an enlarged scale of FIG. 3, where a seat for a possible O-ring can be seen.

DETAILED DESCRIPTION OF THE INVENTION

Figure 1:
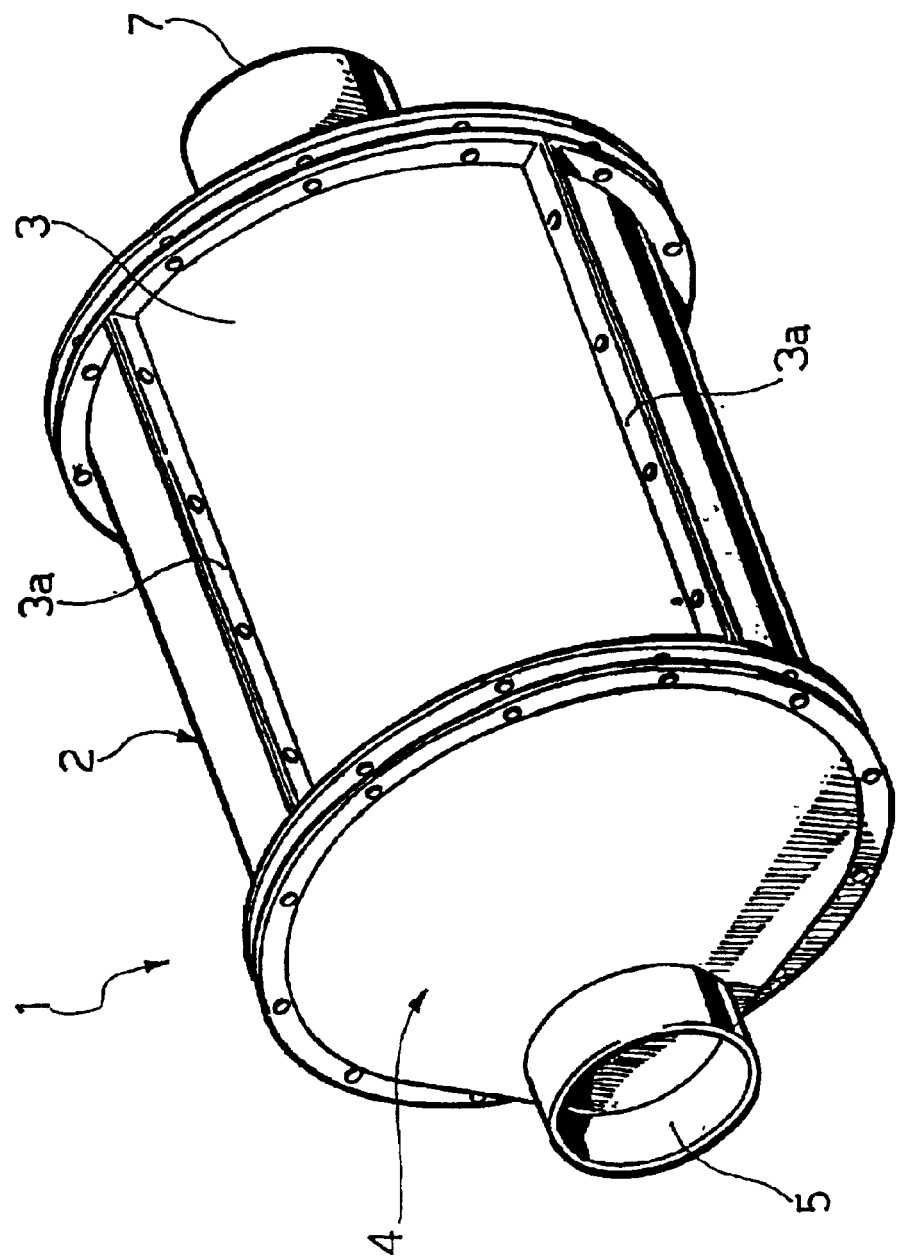
FIG. 1 is a perspective view of a preferred embodiment of a particulate filter for diesel engines according the present invention.

With reference to the drawings, number 1 designates, as a whole, a particulate filter for diesel engines, comprising a metal shell 2 made of steel. The shell 2 comprises a cylindrical wall 3 made up of four sectors screwed together in positions corresponding to longitudinal flanges 3a.

Fixed at one end of the cylindrical wall 3 is a bell-like structure 4 ending in a neck 5 which defines an intake (or outlet) pipe for entry (or exit) of the exhaust gases into (or from) the device. At the opposite end, the cylindrical wall 3 is closed by a disk-shaped wall 6 which has a central opening defined by a neck 7 that constitutes the outlet (or intake) pipe for exit (or entry) of the exhaust gases from (or into) the device.

Arranged in the cavity inside the cylindrical wall 3 are two concentric arrays of filtering elements 8, 9. As may be seen in FIGS. 2, 3 and 4, each of the filtering elements 8, 9 has a plane conformation, with a relatively thick wall. The filtering elements of each array are set with their longitudinal direction parallel to the longitudinal axis 2a of the shell and are set about the said axis. More precisely, in the case of the specific embodiment here illustrated, each array has four filtering elements set orthogonally to one another and in pairs facing one another, according to the sides of a rectangle or square. Of course, it is possible to envisage arrays made up of a larger number of filtering elements, which, in a cross section of the type illustrated in FIG. 2, would be arranged according to the sides of a regular polygon having a number of sides equal to the number of the elements making up the array.

Each pair of adjacent filtering elements of each array rests on a respective radial support 10 which projects radially inwards from the cylindrical wall 3 of the shell 2. In the concrete embodiment developed by the present applicant, each radial support 10 consists of a hollow body made of sheet metal.

In addition, set between each radial support 10 and the filtering elements 8, 9 resting thereon is a ceramic pad 11. In the point of joining between the cylindrical wall 2 and the bell-like structure 4 on one side, and the disk-shaped wall 6 on the other side, there may be set O-rings and a ceramic pad appropriately shaped for constraining the ceramic foams in the axial direction.

Figure 4:
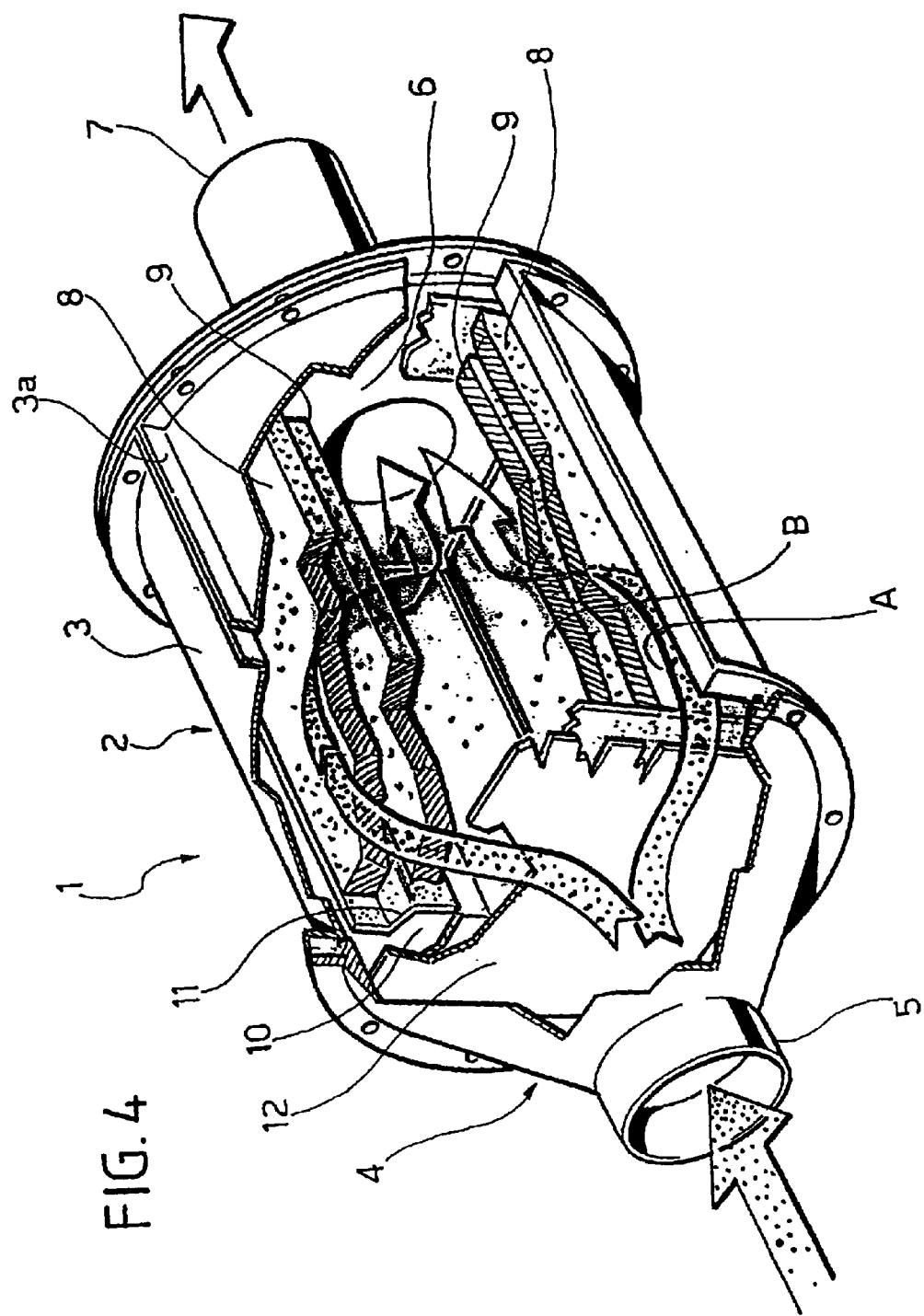
FIG. 4 is a partially sectioned perspective view of the device of FIGS. 1–3, where arrows indicate the direction of flow of the exhaust gases through the device (the direction may, however, be the opposite one).

As emerges clearly from FIGS. 2, 3 and from FIG. 4, the two concentric arrays of filtering elements 8, 9 define, within the shell 2, four chambers A set outside the arrays, and one chamber B set inside the arrays.

The bell-like structure 4 is closed at its base opposite to the neck 5 by a wall 12 which has four peripheral cuts, orthogonal to one another, which set the intake pipe 5 in communication with the outer chambers A, whilst the wall 12 isolates the pipe 5 from the inner chamber B. The latter, instead, communicates directly with the outlet (or intake) pipe 7. Consequently, as may be clearly seen in FIGS. 3 and 4, the flow of exhaust gases entering the device is forced to traverse radially first the array of the filtering elements 8 and then the array of the filtering elements 9 to reach the inner chamber B and the outlet 7, or vice versa.

Furthermore, as may be clearly seen from the drawings, the filtering elements 8, 9 of the two arrays are not in direct contact with one another, but rather define intermediate chambers C.

Thanks to the above-described arrangement, the filter according to the invention is able to guarantee a large filtering surface, with extremely small overall dimensions. At the same time, the filter according to the invention is suited for use of ceramic foams of the type that forms the subject of the international patent application WO00/69542, without any drawback in the corresponding fabrication process. Finally, the structure of the device is extremely simple, in so far as it is made up of a small number of parts and is easy to assemble.

The process for producing the particulate filter for diesel engines involves the preparation of a filtering body consisting of a ceramic foam, on which an oxidizing catalyst is deposited. In the process the ceramic foam is produced, starting from a ceramic-material powder-based suspension (slurry), by preparing a preform of polymeric foam material and impregnating the preform with the aforesaid ceramic-powder slurry so as to distribute the slurry evenly on the preform, and by then subjecting the body thus obtained to a thermal cycle of sintering in such a way as to pyrolize the polymeric material and obtain a high-porosity ceramic material having a structure similar to that of the starting polymeric material.

The ceramic-material powder is chosen from among mullite ($3Al_2O_3$—$2SiO_2$) powder, alumina ($Al_2O_3$) powder, and zirconia ($ZrO_2$) powder, or mixtures thereof, having a purity of over 97%, mean particle size of less than 2 $\mu$m, and a specific surface at least greater than 5 $m^3$/g. The mullite powder has a purity preferably of over 98.7%, a mean particle size of approximately 0.7 $\mu$m, and a specific surface B.E.T. preferably greater than 17.

The alumina powder has a purity of over 99%, preferably of over 99.9%, a mean of particle size of less then 1 $\mu$m, preferably of the order of 0.3 $\mu$m, and a specific surface B.E.T. greater than 7 $m^3$/g, preferably of the order of 10 $m^3$/g.

The zirconia powder has a mean particle size of less than 0.8 $\mu$m, preferably of the order of 0.35 $\mu$m, and a specific surface B.E.T. greater than 5 $m^3$/g, preferably of the order of 6.9 $m^3$/g.

The slurry comprises between 57 wt % and 62 wt % of alumina powder with respect to the total powder, and from 38 wt % to 43 wt % of zirconia powder. The slurry comprises between 36 wt % and 41 wt % of mullite powder with respect to the total powder, and from 59 wt % to 64 wt % of zirconia powder. The slurry comprises 26–35 vol % of zirconia powder with respect to the alumina powder. The slurry comprises 40–50 vol % of zirconia powder with respect to the mullite powder.

The thermal cycle of sintering comprises a first phase of heating up to a temperature of 300–500° C. at a rate of 0.5 to 1.5° C./min, a second phase of heating up to the maximum temperature at a rate of 3 to 10° C./min, and a subsequent cooling at a rate of 3 to 10° C./min. The maximum temperature is 1500° C. in the case of alumina toughened with zirconia, and 1600° C. in the case of mullite toughened with zirconia. The slurry comprises an electrosteric dispersant and a binding agent, preferably polyethylene oxide.

Of course, without prejudice to the principle of the invention, the details of construction and the embodiments may vary widely with respect to what is described and illustrated herein purely by way of example, without thereby departing from the scope of the present invention.

What is claimed is:

1. A particulate filter for diesel engines, comprising a metal shell or casing defining a cavity with an intake pipe and an outlet pipe, and a filtering body made of ceramic foam set in the path of communication between said intake pipe and said outlet pipe, wherein said filtering body is made up of a plurality of separate filtering elements made of ceramic foam and having a substantially planar and elongated shape, which are set about a longitudinal axis of the shell in such a way as to define, inside the shell, an inner chamber set inside the array of filtering elements and at least one outer chamber set outside the array, the said chambers respectively communicating with said intake pipe and with said outlet pipe, or vice versa, in such a way that, during use, the flow of the engine exhaust gases that traverse said shell passing from the intake pipe to the outlet pipe (or vice versa) is forced to traverse the filtering elements, thus assuming a component of radial velocity with respect to the longitudinal axis of the shell.

2. The filter according to claim 1, wherein two concentric arrays of filtering elements are provided.

3. The filter according to claim 2, wherein the filtering elements of each array are four in number and are set orthogonally to one another and in pairs facing one another, according to the sides of a rectangle.

4. The filter according to claim 3, wherein the filtering elements of two adjacent sides rest along their adjacent edges on radial support that project inwards from a cylindrical wall of the shell.

5. The filter according to claim 4, wherein a ceramic pad is set between each radial support and the elements resting thereon.

6. The filter according to claim 4, wherein said cylindrical wall is connected to one end to a bell-shaped structure having a neck that defines the aforesaid intake pipe (or outlet pipe), said structure being closed at its opposite end by a diaphragm which has peripheral openings that force the flow of gas entering (or exiting) the shell to pass into the outer chamber (A) set outside the filtering elements, the opposite end of the cylindrical wall being closed by a diaphragm which has a central neck defining the outlet 9 (intake) pipe and communicating with the inner chamber (B) set inside the array of filtering elements.

7. The filter according to claim 4, wherein the arrays of filtering elements define, outside them, four chambers (A) which are independent of one another.

8. The filter according to claim 4, wherein the adjacent and the facing elements of the two arrays define between them four intermediate chambers (C) which are independent of one another.

9. The filter according to claim 1 wherein each filtering element is obtained by a process including the preparation of a filtering body consisting of a ceramic foam, on which an oxidizing catalyst is deposited, in the process the ceramic foam is produced, starting from a ceramic-material powder-based suspension (slurry), by preparing a preform of polymeric foam material and impregnating the preform with the aforesaid ceramic-powder slurry so as to distribute the slurry evenly on the preform, and by then subjecting the body thus obtained to a thermal cycle of sintering in such a way as to pyrolize the polymeric material and obtain a high-porosity ceramic material having a structure similar to that of the starting polymeric material, the ceramic-material powder is chosen from among mullite ($3Al_2O_3$—$2SiO_2$) powder, alumina ($Al_2O_3$) powder, and zirconia ($ZrO_2$) powder, or mixtures thereof, having a purity of over 97%, mean particle size of less than 2 $\mu$m, and a specific surface at least greater than 5 $m^3/g$.

10. A process according to claim 9, characterized in that the mullite powder has a purity preferably of over 98.7%, a mean particle size of approximately 0.7 $\mu$m, and a specific surface B.E.T. preferably greater than 17.

11. A process according to claim 9, characterized in that the alumina powder has a purity of over 99%, a mean particle size of less then 1 $\mu$m, and a specific surface B.E.T. greater than 7 $m^3/g$.

12. A process according to claim 9, characterized in that the zirconia powder has a mean particle size of less than 0.8 $\mu$m and a specific surface B.E.T. greater than 5 $m^3/g$.

13. A process according to claim 9, characterized in that the slurry comprises between 57 wt % and 62 wt % of alumina powder with respect to the total powder, and from 38 wt % to 43 wt % of zirconia powder.

14. A process according to claim 9, characterized in that the slurry comprises between 36 wt % and 41 wt % of mullite powder with respect to the total powder, and from 59 wt % to 64 wt % of zirconia powder.

15. A process according to claim 9, characterized in that the slurry comprises 26–35 vol % of zirconia powder with respect to the alumina powder.

16. A process according to claim 9, characterized in that the slurry comprises 40–50 vol % of zirconia powder with respect to the mullite powder.

17. A process according to claim 9, characterized in that the thermal cycle of sintering comprises a first phase of heating up to a temperature of 300–500° C. at a rate of 0.5 to 1.5° C./min, a second phase of heating up to the maximum temperature at a rate of 3 to 10° C./min, and a subsequent cooling at a rate of 3 to 10° C./min.

18. A process according to claim 17, characterized in that the maximum temperature is 1500° C. in the case of alumina toughened with zirconia, and 1600° C. in the case of mullite toughened with zirconia.

19. A process according to claim 9, characterized in that the slurry comprises an electrosteric dispersant and a binding agent.

* * * * *